US006870960B2

United States Patent
Ogawa

(10) Patent No.: US 6,870,960 B2
(45) Date of Patent: Mar. 22, 2005

(54) IMAGE ENCODER AND METHOD OF ENCODING IMAGES ACCORDING TO WEIGHT OF PORTIONS OF IMAGE

(75) Inventor: Nobuhiro Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 09/976,016

(22) Filed: Oct. 15, 2001

(65) Prior Publication Data

US 2002/0044693 A1 Apr. 18, 2002

(30) Foreign Application Priority Data

Oct. 17, 2000 (JP) ...................................... 2000-316229

(51) Int. Cl.[7] .............................................. G06K 9/36
(52) U.S. Cl. ...................... 382/236; 382/250; 382/251
(58) Field of Search ...................... 375/240.23, 240.12; 382/232, 236, 238, 248, 250, 251; 348/398.1, 403.1

(56) References Cited

U.S. PATENT DOCUMENTS 5,136,376 A * 8/1992 Yagasaki et al. ....... 375/240.23
6,125,143 A * 9/2000 Suzuki et al. .......... 375/240.11

FOREIGN PATENT DOCUMENTS

| JP | 6-30402 | 2/1994 | .......... H04N/1/137 |
| JP | 6-133300 | 5/1994 | .......... H04N/1/137 |
| JP | 6-169452 | 6/1994 | .......... H04N/1/137 |
| JP | 6-205396 | 7/1994 | .......... H04N/1/137 |
| JP | 408336107 A | * 12/1996 | ............ H04N/5/92 |

* cited by examiner

Primary Examiner—Anh Hong Do
(74) Attorney, Agent, or Firm—Whitman, Curtis & Christofferson, PC

(57) ABSTRACT

An image encoder divides an input image frame into a plurality of blocks, detects a motion vector of each block, arranges the blocks into one or more groups based on the motion vector, and calculates the first weighting coefficient based on the number of blocks included in each group. The image encoder arranges the plurality of blocks into one or more groups of blocks based on DC components of brightness and color information of each block, and calculates the second weighting coefficient based on the distance between the center of each block and the center of the input image frame. The image encoder determines a quantization step width based on one or two of the first and second weighting coefficients, using the detected motion vector. Further, the image encoder quantizes each of the plurality of blocks by the determined quantization step width so as to encode the input image frame.

20 Claims, 7 Drawing Sheets

IMAGE ENCODER AND METHOD OF ENCODING IMAGES ACCORDING TO WEIGHT OF PORTIONS OF IMAGE

BACKGROUND OF THE INVENTION

1. Field of the Invention

The present invention relates to an image encoding technique for compressing images, and, more particularly, to an image encoding technique which is suitable for a TV conference system or TV telephone system and which enables to transmit the important image portion of a whole image, such as a person's image, etc. by compressing according to weight of each portion of the whole image.

2. Description of the Related Art

Like TV conference systems or TV telephone systems, in the case where motion pictures or static images are compressed to lower an amount of data to be transmitted.

FIG. 7 is a circuitry block diagram showing an example of an image encoder.

In FIG. 7, a frame divide circuit 101 divides an input image of one frame into an (N×M) number of blocks, writes the divided input image into a frame memory 102, and also inputs the input image to a motion prediction circuit 103. The frame memory 102 sets the written image to be delayed by one frame and inputs the delayed image to the motion prediction circuit 103. The motion prediction circuit 103 compares each block (target block) included in the frame input from the frame divide circuit 101 with a block of a previously-input frame input from the frame memory 102, which is in the same position as the position of the target block and also with its neighboring blocks of the block of the previously-input frame input from the frame memory 102, and selects a block from the compared blocks of the previously-input frame input from the frame memory 102. Then, the motion prediction circuit 103 detects a difference between the positions of the target block and the selected block to decide a movement of the target block, and sets the movement as a motion vector. An interframe prediction circuit 104 detects the position of the selected block of the previously-input frame which corresponds to the target block based on the motion vector value obtained from the motion prediction circuit 103, and calculates the differential data which represents the difference between the target block and the selected block of the previously-input frame. Then, the interframe predictor circuit 104 creates image data based on the calculated differential data in combination with the motion vector.

An orthogonal transformation circuit 105 performs DCT (Discrete Cosine Transformation) for the differential data by each block. A quantization circuit 106 quantizes data received from the orthogonal transformation circuit 105 by a step width informed from a quantization step width calculation circuit 110. An encoding circuit 107 encodes the quantized data and the motion vector value into a variable-length code and stores the quantized data in a transmission buffer circuit 108. After this, the stored data is transmitted to a transmission path at a constant rate in accordance with a transfer rate. A buffer-storage amount detection circuit 109 detects an amount of data stored in the transmission buffer circuit 108, and informs the quantization step width calculation circuit 110 about the detected amount or data stored therein. The quantization step width calculation circuit 110 calculates a quantization step width in accordance with the storage amount, and informs the quantization circuit 106 of the calculated quantization step width.

Unexamined Japanese Patent Application KOKAI Publication No. H6-169452 discloses an image compression technique which is an improved form of the above-described image compression technique. This prior art technique disclosed in the publication will now be explained with reference to FIGS. 8 and 9.

FIG. 8 is a circuitry block diagram showing an image encoder employing the image compression technique disclosed in Unexamined Japanese Patent Application KOKAI Publication No. H6-169452. In FIG. 8, a frame divide circuit 201, a frame memory 202, an interframe prediction circuit 204, an orthogonal transformation circuit 205, a quantization circuit 206, an encoding circuit 207, a transmission buffer circuit 208 and a buffer-storage amount detection circuit 209 respectively have the same functions as those shown in FIG. 7.

A motion prediction circuit 203 has the same function as the motion prediction circuit 103 shown in FIG. 7, and also stores the detected motion vector value of each block in a motion-vector-value memory 211. A block grouping section 212 arranges (classifies) blocks of the image data into groups, each of which includes blocks having the common directional vector and blocks surrounded by those blocks, according to motion vector value of each block. A function selector 213 provides a plurality of quantization step width functions, in each of which the storage amount "x" is a variable. For example, the function selector 213 has functions g1(x), g2(x), and g3(x), as shown in FIG. 9.

The function g1(x) should be employed for quantizing image data in a high level of preciseness, in association with a small quantization step width for the storage "x". The function g2(x) should be employed for quantizing image data in a relatively low level of preciseness, in association with an intermediate quantization step width for the storage "x". The function g3(s) should be employed for quantizing image data in a very low level of preciseness, in association with a high quantization step width for the storage "x".

For example, in the TV conference system etc., input image data generally includes persons' image. Blocks of the face portion of the input image have the same directional vector, and occupy a relatively large area of a display screen. Hence a large number of blocks in the face portion constitute one group. Additionally, an image portion corresponds to a person's hand or an image portion corresponds to persons behind the centered person has the same motion. However, such an image portion occupies only a small area of the input image, and hence comprising only a small number of blocks forming a single group. Further a tiny piece of image data having motion in itself is composed of a very small number of blocks. Further, a static image is displayed with a group of block without any motion.

A quantization step width calculation circuit 214 calculates an quantization step width based on either one of the functions g1(x), g2(x) and g2(x), in association with each block portion, and informs the quantization circuit about the calculated step width. The transmission buffer circuit 208 transmits image data to a transmission path, in accordance with a suitable level of preciseness or the image data. Specifically, the important portion of the display screen, such as the face of the person in center of the view, is transmitted in a high level of preciseness, the hand portion of the person in the image data is transmitted in a relatively low level of preciseness, and a portion of the image data without any motion is transmitted in a very low level of preciseness.

Unexamined Japanese Patent Application KOKAI Publication No. H6-30402 discloses an image encoder which divides an input image into a plurality of blocks, determined whether each block is the most important portion of the input image based on a movement amount, size and frequency of a motion vector thereof, and assigns a relatively large number of codes to one block which has been determined as a block corresponding to the most important portion of the input image.

The following problems are found in the above prior art techniques.

As shown in FIG. 7, a circuit which employs the conventional image compression technique calculates a quantization stop width in accordance with an amount of data stored in the transmission buffer, and quantizes image data. The same function for calculating the quantization step width is employed for any of the blocks of one display screen, regardless of whether each block corresponds to the most important portion of the input image. A problem arises in that a quite large amount of data is required for a portion of the image data which is not so important in the display screen, and resulting in a lack of data for expressing the most important portion, i.e. possibly the centered person in the display screen.

A circuit which employs the image compression technique disclosed in Unexamined Japanese Patent Application KOKAI Publication No. H6-169452 includes a plurality of image blocks arranged into groups based on motion vector values, and sets a quantization step width in accordance with the number of blocks included in each group. Thus, in the case where the input image has no motion, the most important portion of the input image can not be transmitted with a high level of preciseness.

Similarly, in the image encoder disclosed in Unexamined Japanese Patent Application KOKAI Publication No. H6-30402, if there is a large motion vector in the input image data, a large number of blocks corresponding to the large motion vector are transmitted in a high level of preciseness. Thus, in the case where there is no motion in the input image, the important portion in the input image without any motion can not be transmitted in a high level of preciseness.

According to the structures or the image compression technique disclosed in Unexamined Japanese Patent Application KOKAI Publication No. H6-169452 and image encoder disclosed in Unexamined Japanese Patent Application KOKAI Publication No. H6-30402, in the case where the input image are moving in its entirety, both of the important portion and rest of portions in the input image are transmitted in the same level or preciseness. Therefore, the important portion of the input image can not be transmitted in a high level of preciseness.

SUMMARY OF THE INVENTION

The present invention has been made in consideration of the above. It is accordingly an object of the present invention to provide an image encoder which can transmit the important portion, such as a person's view, of a display screen in a high level of preciseness, even when there is no motion in the entire input image, an image encoding method and a program for realizing the above.

The present invention relates also to an image encoder which can transmit the important portion, such as a person's view, of a display screen in a high level of preciseness even when the whole image of the display screen is moving in its entirety, and an image encoding method and a program for realizing the above.

In order to achieve the above objects, according to the first aspect of the present invention, there is provided an image encoding method of compressing and encoding an input image frame, comprising:

dividing the input image frame into a plurality of blocks;

detecting a motion vector of each of the plurality of blocks;

classifying the plurality of blocks into one or more groups, according to one or two grouping method selected from motion vector based grouping based on the value of the detected motion vector and DC component based grouping based on DC components of brightness and color information of each block;

calculating a first weighting coefficient of the one or more groups in a case where the plurality of blocks are classified according to the motion vector based grouping, and calculating a second weighting coefficient of the one or more groups in a case where the plurality of blocks are classified according to the DC component based grouping; and quantizing each of the plurality of blocks by a quantization step width determined based on the first or second weighting coefficient.

According to the image encoding method, each portion of the display screen can be classified by the brightness or color information, even there is no motion in the input image, and the important portion, such as a person's image, etc. can be encoded in a high level of preciseness.

In a case where the motion vector is detected, the classifying may classify the plurality of blocks according to the motion vector based grouping, and the quantizing quantizes each of the plurality of blocks by the quantization step width determined based on the first weighting coefficient; and in a case where the motion vector is not detected, the classifying may classify the plurality of blocks according to DC component based grouping, and the quantizing quantizes each of the plurality of blocks by the quantization step width determined based on the second weighting coefficient.

In a case where the motion vector is detected:

the classifying may classify the plurality of blocks according to motion vector based grouping and the DC component based grouping; and the quantizing may quantize each of the plurality or blocks by the quantization step width determined based on both the first and second weighting coefficients.

Having classified the plurality of blocks according to motion vector and DC component, the important portion of the input image can be encoded in a high level of preciseness, even in the case where the input image is move in its entirety.

The weighting coefficient calculating may calculate the first weighting coefficient based on number of blocks included in each of the one or more groups classified according to motion vector based grouping.

The weighting coefficient calculating may calculate the second weighting coefficient based on a distance between center of each of the plurality of blocks, included in each group of the one or more groups classified according to DC component based grouping, and center of the input image frame.

In order to achieve the above objects, according to the second aspect of the present invention, there is provided an image encoder which compresses and encodes an input image frame, the image encoder comprising:

a frame divide circuit which divides the input image frame into a plurality of blocks;

a motion prediction circuit which detects a motion vector of each of the plurality of blocks;

an interframe prediction circuit which generates differential data in the plurality of blocks based on the motion vector detected by the motion prediction circuit;

an orthogonal transformation circuit which performs discrete cosine transformation for the differential data generated by the interframe prediction circuit, and calculates DC components of brightness and color information of each of the plurality of blocks;

a weighting section which calculates a quantization step width for use in quantizing resultant data of the discrete cosine transformation performed by the orthogonal transformation circuit based on the motion vector detected by the motion prediction circuit and the DC components calculated by the orthogonal transformation circuit; and a quantization circuit which quantizes the resultant data of the discrete cosine transformation performed by the orthogonal transformation circuit, by the quantization step width calculated by the weighting section.

According to such an image encoder, each portion of the display screen can be classified based on the brightness or color information of each block, even in the case where there is no motion in the input image, and the important portion, such as a person's image, etc. can be encoded in a high level of preciseness.

The weighting section may includes:
a motion vector based grouping section which classifies the plurality of blocks into one or more groups, based on a value of the motion vector detected by the interframe prediction circuit;
a DC component based grouping section which classifies the plurality of blocks into one or more groups, based on the DC components of each or the plurality of blocks which are calculated by the orthogonal transformation circuit;
a weighting coefficient calculation circuit which calculates a weighting coefficient for determining the quantization step width for each of the plurality of blocks; and
a quantization step width calculation circuit which calculates the quantization step width based on the weighting coefficient calculated by the weighting coefficient calculation circuit, and
wherein the weighting coefficient calculation circuit calculates a first weighting coefficient for the one or more groups classified by the motion vector based grouping section, calculates a second weighting coefficient for the one or more groups classified by the DC component based grouping section, and calculates a weighting coefficient for determining quantization step width based on one or two weighting coefficients selected from the first and second weighting coefficients, using the motion vector detected by the motion prediction circuit.

The image encoder may further comprise
a frame memory which stores the input image frame which has been divided into the plurality of blocks by the frame divide circuit, and
wherein the motion prediction circuit compares each of the plurality of blocks with blocks included in a previously-input image frame stored in the frame memory so as to detect the motion vector.

In the image encoder, the weighting coefficient calculation circuit may:
set the first weighting coefficient as a weighting coefficient for determining the quantization step width, in a case where the motion vector is detected by the motion prediction circuit; and set the second weighting coefficient as a weighting coefficient for determining the quantization step width, in a case where the motion vector is not detected by the motion prediction circuit.

In the image encoder,
the weighting coefficient calculation circuit may set a product of the first and second weighting coefficients as a weighting coefficient for determining the quantization step width, in a case where the motion vector is detected by the motion prediction circuit.

According to this structure, even in the case where the input image is moving in its entirety, each portion of the display screen can be classified based on the brightness or color information, so that the important portion thereof can be encoded in a high level of preciseness.

In the image encoder,
the weighting coefficient calculation circuit may calculate the first weighting coefficient, based on number of blocks included in the one or more groups classified by the first grouping section.

In the image encoder,
the weighting coefficient calculation circuit may calculate the second weighting coefficient based on a distance between center of each block, included in each group of the one or more groups classified by the second grouping section, and center of the input image frame.

In the image encoder:
the motion vector based grouping section may classify the plurality of blocks into groups, in such a way that each of the groups forms a continuous portion of the input image frame; and
the DC component based grouping section may classify the plurality of blocks into groups, in such a way that each of the groups forms a continuous portion of the input image frame.

That is, even in the case where two portions of the input image have the similar motion, color, brightness etc., those two portions are classified into different two groups.

Thus, even in the case where two different persons have the similar motion in the display screen, portions of the input image which may correspond to the face part, hair part, etc. of the two different persons are arranged into different groups, and only the portion corresponding the important person can be encoded in a high level of preciseness In the image encoder,
the weighting section may include a weighting coefficient re-calculation circuit which re-calculates a weighting coefficient using the first and second weighting coefficients calculated by the weighting coefficient calculation circuit and each of a plurality of previous weighting coefficients, and
the quantization step width calculation circuit may determine the quantization step width based on the re-calculated weighting coefficient.

Having re-calculated the previously-calculated weighting coefficients, even if a calculated weighting coefficient is an inappropriate value as a result of undesirable grouping, no serious problem should occur.

The image encoder may further comprise:
an encoding circuit which encodes the data quantized by the quantization circuit and data representing the motion vector detected by the motion prediction circuit into a variable-length code;
a transmission buffer which stores the data which is encoded into the variable-length code by the encoding circuit; and
a buffer storage amount checking circuit which checks an amount or data stored in the transmission buffer, and wherein the quantization step width calculation circuit calculates the quantization step width based on the data amount checked by the buffer storage amount checking circuit and the weighting coefficient for determining the quantization step width.

In order to achieve the above objects, according to the third aspect of the present invention, there is provided a computer readable recording medium which records a program for controlling a computer to execute:

dividing an input image frame into a plurality of blocks;

detecting a motion vector of each of the plurality of blocks;

classifying the plurality of blocks into one or more groups, according to one or two grouping method selected from motion vector based grouping based on the value of the detected motion vector and DC component based grouping based on DC components of brightness and color information of each block;

calculating a first weighting coefficient of the one or more groups in a case where the plurality of blocks are classified according to the motion vector based grouping, and calculating a second weighting coefficient of the one or more groups in a case where the plurality of blocks are classified according to the DC component based grouping; and quantizing each of the plurality of blocks by a quantization step width determined based on the first or second weighting coefficient.

BRIEF DESCRIPTION OF THE DRAWINGS

These object and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will now be described with reference to the accompanying drawings.

Figure 1:
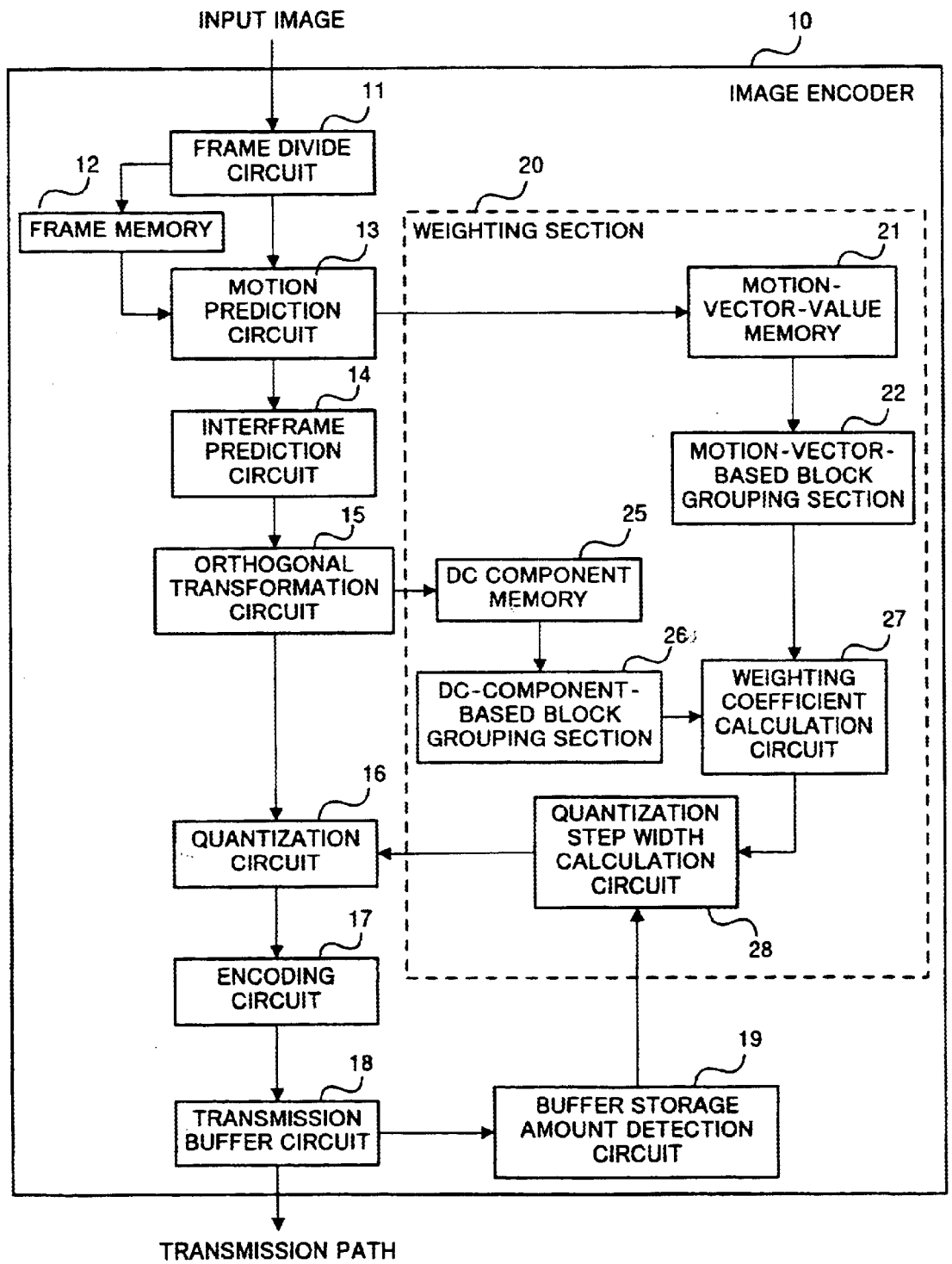
FIG. 1 is a block diagram showing the structure of the main parts of an image encoder according to the first embodiment of the present invention.

FIG. 1 is a diagram showing the structure of the main parts of an image encoder according to the first embodiment of the present invention.

As shown in FIG. 1, an image encoder 10 according to this embodiment comprises a frame divide circuit 11, a frame memory 12, a motion prediction circuit 13, an interframe prediction circuit 14, an orthogonal transformation circuit 15, a quantization circuit 16, an encoding circuit 17, a transmission buffer circuit 18, a buffer-storage amount detection circuit 19, a motion-vector-value memory 21, a motion-vector-based block grouping section 22 which groups blocks based on motion vector, a DC component memory 25, a DC-component-based block grouping section 26 which groups blocks based on DC component, a weighting coefficient calculation circuit 27 and a quantization step width calculation circuit 28.

The frame divide circuit 11, the frame memory 12, the motion prediction circuit 13, the interframe prediction circuit 14, the orthogonal transformation circuit 15, the quantization circuit 16, the encoding circuit 17 and the transmission buffer circuit 18 are connected in series, sequentially process image data input to the image encoder 10 so as to encode the input image data, and send the encoded image data from the transmission buffer circuit 18 to a transmission path.

The motion-vector-value memory 21, the motion-vector-based block grouping section 22, the DC component memory 25, the DC-component-based block grouping section 26, the weighting coefficient calculation circuit 27 and the quantization step width calculation circuit 28 constitute a weighting section 20 which is one of the features of the present invention. The weighting section 20 arranges blocks of the input image data into groups of blocks, which have the common properties to each other within the same group, based on the motion vector value detected by the motion prediction circuit 13 and the DC component calculated by the orthogonal transformation circuit 15 and calculates the weighting coefficient of each block. The calculated weighting coefficient is a coefficient representing the importance of each block. The weighting section 20 determines the importance of each block, based on the motion vector value or the DC component, and assigns a large weighting coefficient to the block, determined to be highly important. Further, the weighting section 20 calculates the quantization step width necessary when the quantization circuit 16 quantizes the image data, based on the calculated weighting coefficient and data amount of the transmission buffer circuit 18 which is detected by the buffer-storage amount detection circuit 19. After this, the weighting section 20 provides the quantization circuit 16 with the calculated quantization step width.

Each circuit or section included in the image encoder 10 will now be described.

The frame divide circuit 11 divide one frame of the image data input to the image encoder 10 into an (N×M) number of blocks each having an (n×n) number of pixels. The frame divide circuit 11 writes each of the blocks into the frame memory 12, and inputs them to the motion prediction circuit 13.

The frame memory 12 sets the written blocks to be delayed by a single frame timing, and inputs the delayed blocks to the motion prediction circuit 13.

The motion prediction circuit 13 compares a block (target block) of a frame input from the frame divide circuit 11 with a block of a previously-input frame which is in the same position as the position of the target block and also with neighboring blocks of the previously-input frame, and finds out a block having the smallest difference from the target block, for each block included in the single frame input from the frame divide circuit 11. The motion prediction circuit 13 then calculates a movement direction and amount of the found block with respect to the target block and sets a motion vector between the two blocks, and writes a value of the motion vector into the motion-vector-value memory 21.

The interframe prediction circuit 14 detects the position of the found block in the previously-input frame based on the motion vector obtained by the motion prediction circuit 13, calculates differential data between the target block and the found block, and creates image data based on the calculated differential data and the value of the motion vector.

The orthogonal transformation circuit 15 performs DCT (Discrete Cosine Transformation) so as to transform the differential data generated by the interframe prediction circuit 14, for each block, and sends the transformed data to the quantization circuit 16. At this time, the orthogonal transformation circuit 15 writes DC (Direct Current) components of the brightness and color information of each block into the DC component memory 25.

The quantization circuit 16 divides tie data sent from the orthogonal transformation circuit 15 by the quantization step width calculated by the quantization-step-width calculation circuit 28, and leaves out the remainder of the division so as to quantize the data from the orthogonal transformation circuit 15, and sends the resultant quantization to the encoding circuit 17.

The encoding circuit 17 encodes the data quantized by the quantization circuit 16 and the data of the motion vector into a variable-length code, and sends the variable-length encoded data to the transmission buffer circuit 18. Since the appearance probability of the orthogonal transformed data or motion vector are uneven, an amount of information to be transmitted can be made smaller, by variable-length encoding the information so as to achieve compressing of the information. That is, when to variable-length encode target data, the encoding circuit 17 assigns a short length code to a value showing a high appearance probability and a long length code to a value showing a low appearance probability.

The transmission buffer circuit 18 stores data sent from the encoding circuit 17, and sends the stored data at a constant transmission rate in harmony with the transmission rate of the transmission path.

The buffer-storage amount detection circuit 19 detects a storage amount of data stored in the transmission buffer circuit 18, and informs the quantization-step-width calculation circuit 28 of the detected storage amount.

The motion-vector-value memory 21 stores the motion vector(s) written by the motion prediction circuit 13 by each block of the input image frame, and supplies the motion-vector-based block grouping section 22 with the stored motion vector(s).

The motion-vector-based block grouping section 22 arranges blocks of the input image frame into groups each of which is composed of a plurality of blocks showing the common-directional motion vector, based on the value of the motion vector of each block stored in the motion-vector-value memory 21. After this, the motion-vector-based block grouping section 22 supplies the weighting coefficient calculation circuit 27 with grouping information (by motion vector) representing a plurality of blocks belonging respectively to their corresponding groups in association with each other. At this time, in the case where the input image data has no motion and can not be arranged into groups based on the motion vector, the motion-vector-based block grouping section 22 supplies the weighting coefficient calculation circuit 27 with information about that as the grouping information. When grouping the blocks, the motion-vector-based block grouping section 22 arranges the blocks of the input image frame into groups in consideration of the positional relationship of each block, so that neighboring blocks showing the common directional vector belongs to the same group. Even if two different portions of the same, display screen have the similar motion, the motion-vector-based block grouping section 22 still arranges those two different portions into different groups.

The DC component memory 25 stored the DC components of the brightness and color information which are written by the orthogonal transformation circuit 15, according to each block of the input image frames and supplies the DC-component-based block grouping section 26 with the stored DC components.

The DC-component-based block grouping section 26 arranges the blocks of the input image frame into groups, in such a way that blocks showing close values to each other belong to the same group, based on the values of the DC components of the brightness and color information stored in the DC component memory 25. Then, the DC-component-based block grouping section 26 supplies the weighting coefficient calculation circuit 27 with grouping information (by DC component), representing the plurality of blocks respectively belong to groups in association with each other. Specifically, likewise the quantization circuit 16, the DC-component-based block grouping section 26 divides each of the DC components by a predetermined step width, and compares the resultant quotient of the divisions without the remainder thereof between the blocks, so as to accomplish the above grouping. The above blocks are arranged into groups based on the brightness information and color information, thereby grouping the blocks each having the similar color, brightness, etc. to figure the face, hair, clothes and background images. When grouping the blocks, the DC-component-based block grouping section 26 arranges the block of the input image frame into groups, so that neighboring blocks showing the close DC component value to each other belong to the same group, in consideration of the positional relationship of the blocks. In the case where two different portions of the display screen have the similar brightness or colors, the DC-component-based block grouping section 26 still arranges those two different portions into different groups.

Figure 2:
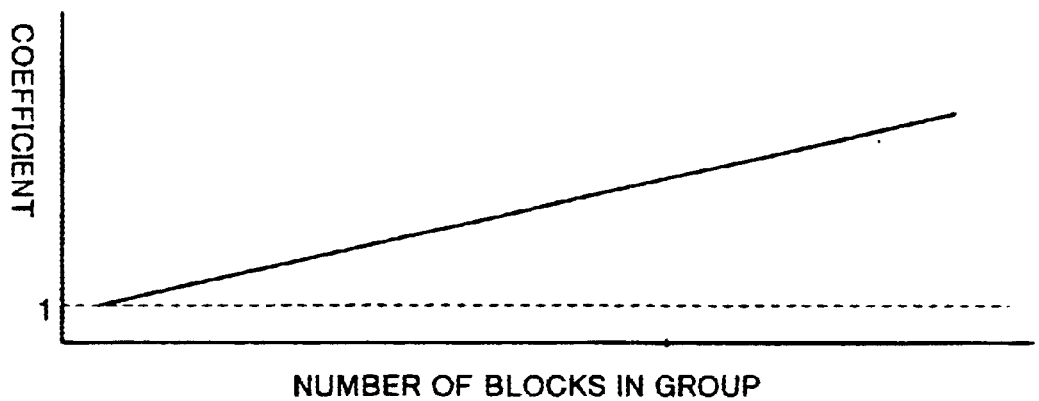
FIG. 2 is a graph showing the relationship between the numbers of blocks and weighting coefficients, based on which the image encoder according to the first embodiment calculates weighting coefficients.

Upon reception of the grouping information (by motion vector) about motion of image data, for each group specified in the received grouping information, the weighting coefficient calculation circuit 27 assigns a weighting coefficient to each of the blocks included in the group, based on the number of blocks of the group and the graph shown in FIG. 2. As illustrated in FIG. 2, the more the number of blocks increases, the larger the assigned weighting coefficient becomes.

Figure 3:
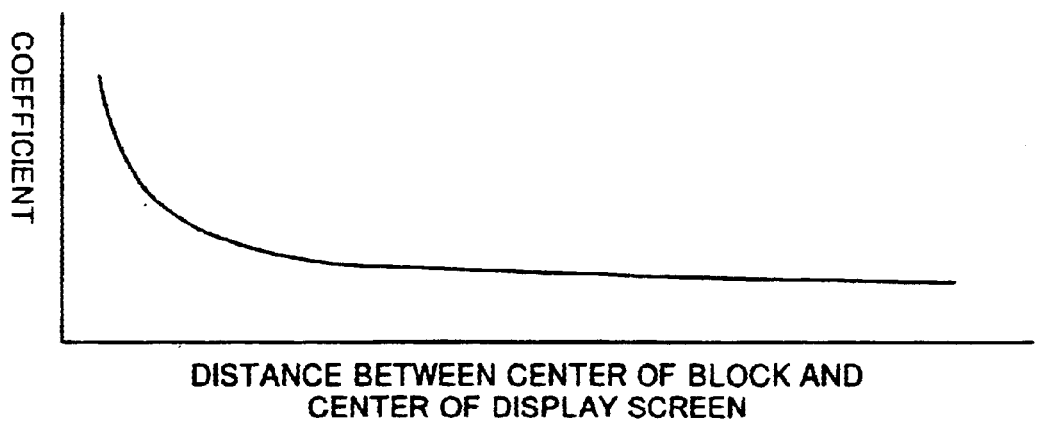
FIG. 3 is a graph showing the relationship between weighting coefficients and the distance between the center of a block and the center of a display screen, based on which the image encoder of the first embodiment calculates weighting coefficients.

On the contrary, upon reception of the grouping information (by motion vector) representing that the grouping can not be achieved based on motion vector, the weighting coefficient calculation circuit 27 calculates a temporary weighting coefficient of each block included in each group shown in the grouping information (by DC component) in accordance with the information specified in the graph of FIG. 3, based on the grouping information (by DC component) supplied from the DC-component-based block grouping section 26. Then, the weighting coefficient calculation circuit 27 obtains a mean value of the calculated weighting coefficients of the blocks included in the group, and sets the mean value as a weighting coefficient of the blocks included in the group shown in the grouping information (by DC component). As shown in FIG. 3, the larger weighting coefficient is given to the more centered positioned blocks. This is because the more centered position image portions may possibly be important to the rest of image portions.

Figure 4:
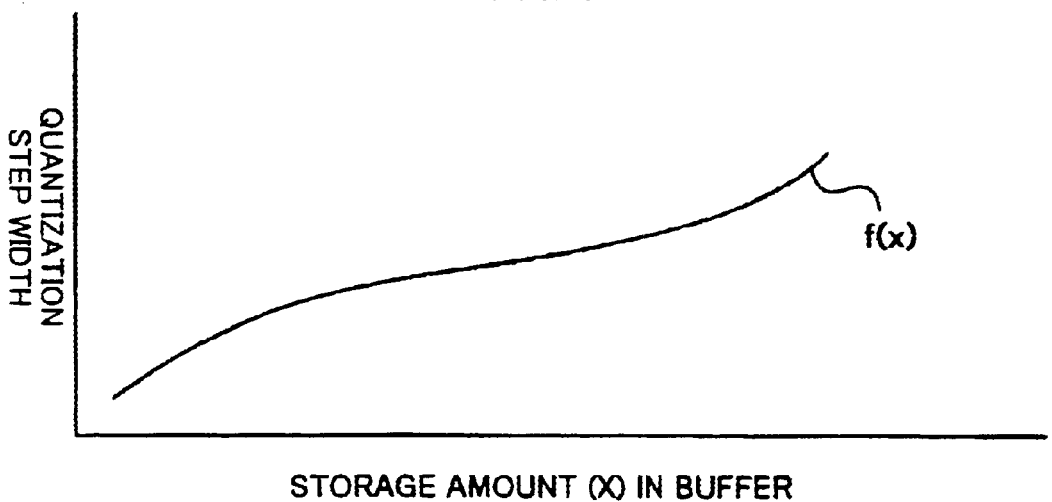
FIG. 4 is a graph showing the relationship between quantization step widths and storage amounts in a transmission buffer, based on which the image encoder of the first embodiment calculates a function f(x)

The quantization step width calculation circuit 28 calculates the quantization step width in accordance with the amount of storage in the transmission buffer, using functions f(x) shown in FIG. 4. After this, the quantization step width calculation circuit 28 divides the quantization step width of each block by the weighting coefficient of the block which is sent from the weighting coefficient calculation circuit 27, sets a resultant division as a quantization step width of the block, and sends the set quantization step width to the quantization circuit 16.

Operations of the image encoder 10 will now be explained, mainly focusing on the weighting section 20.

Figure 6A:
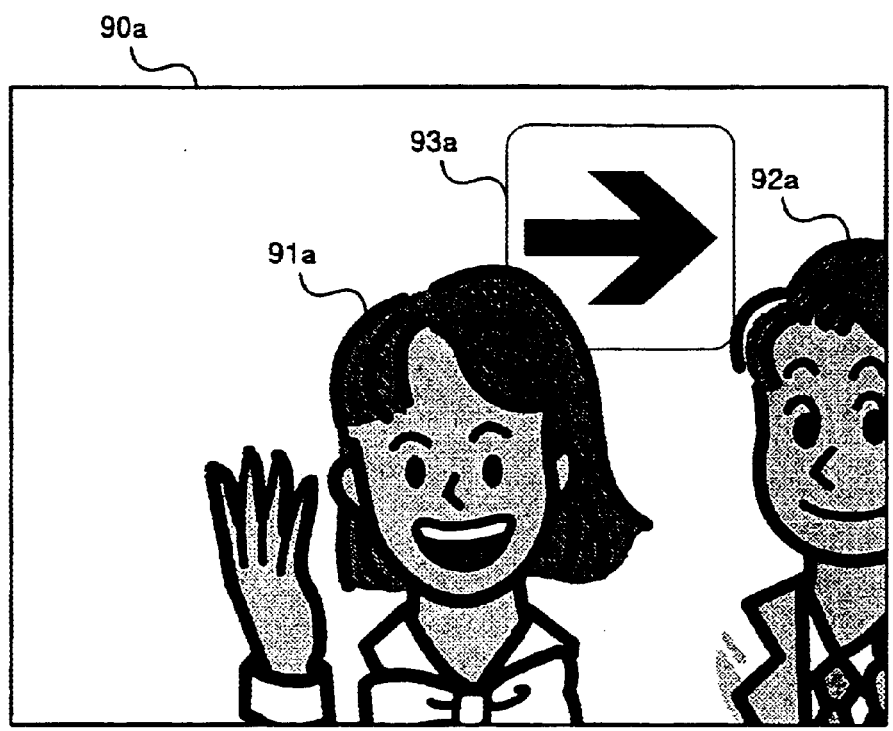
FIGS. 6A and 6B are diagrams each exemplarily showing an image input to a camera of a TV conference system or TV telephone system.
Figure 6B:
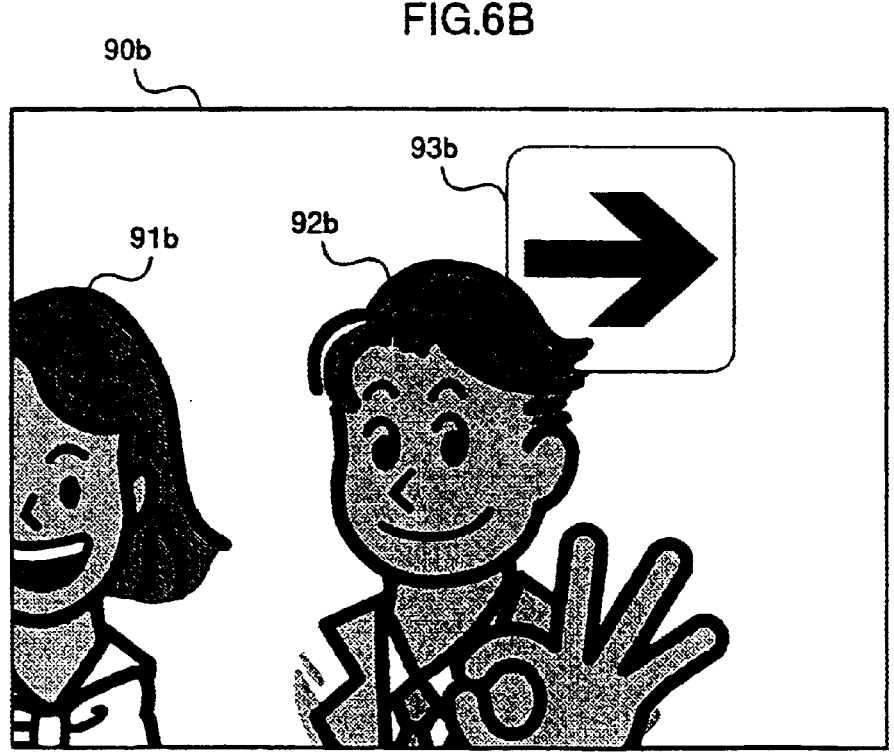
Figure 7:
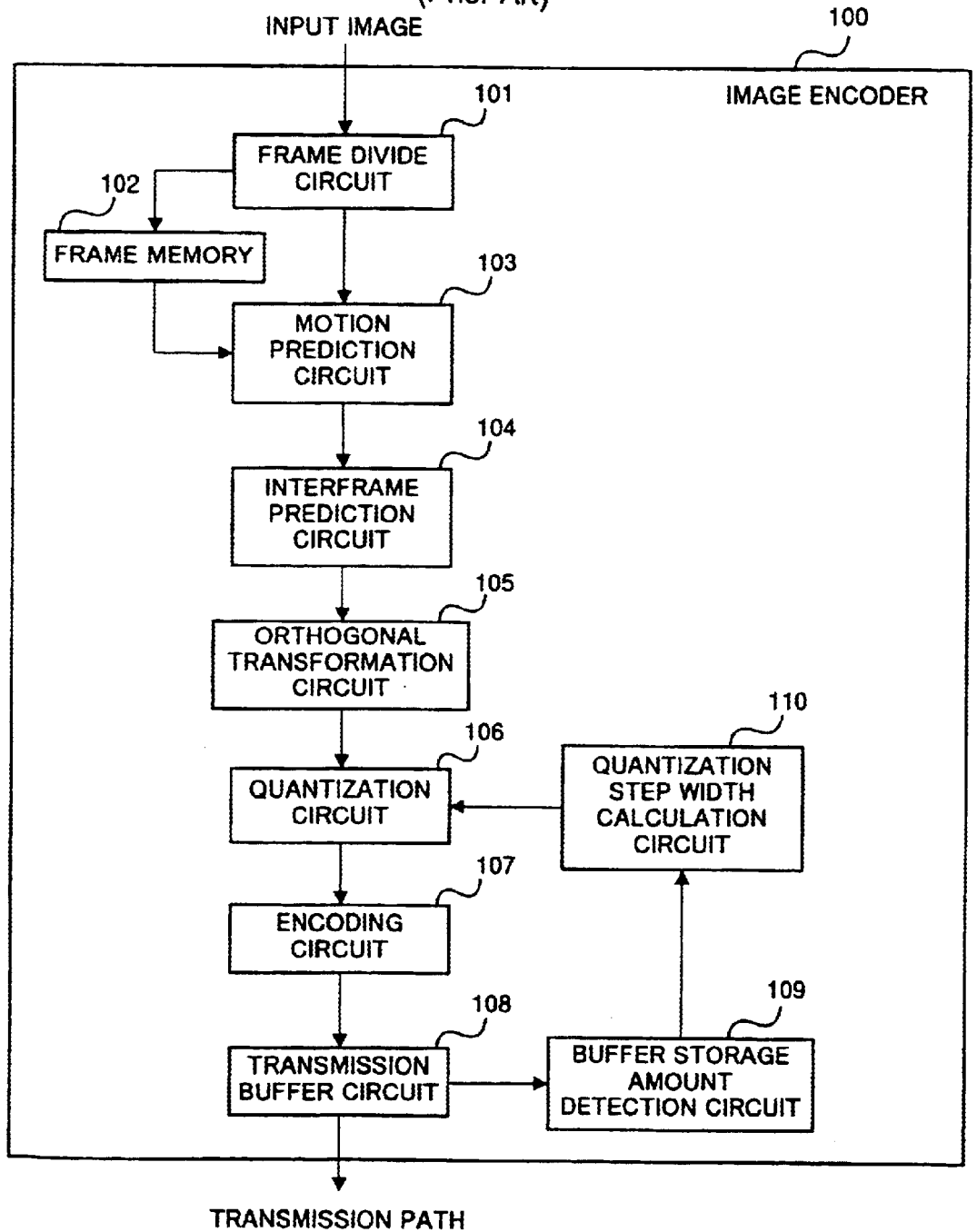
FIG. 7 is a diagram showing the structure of a circuit which employs a conventional image compression technique.
Figure 8:
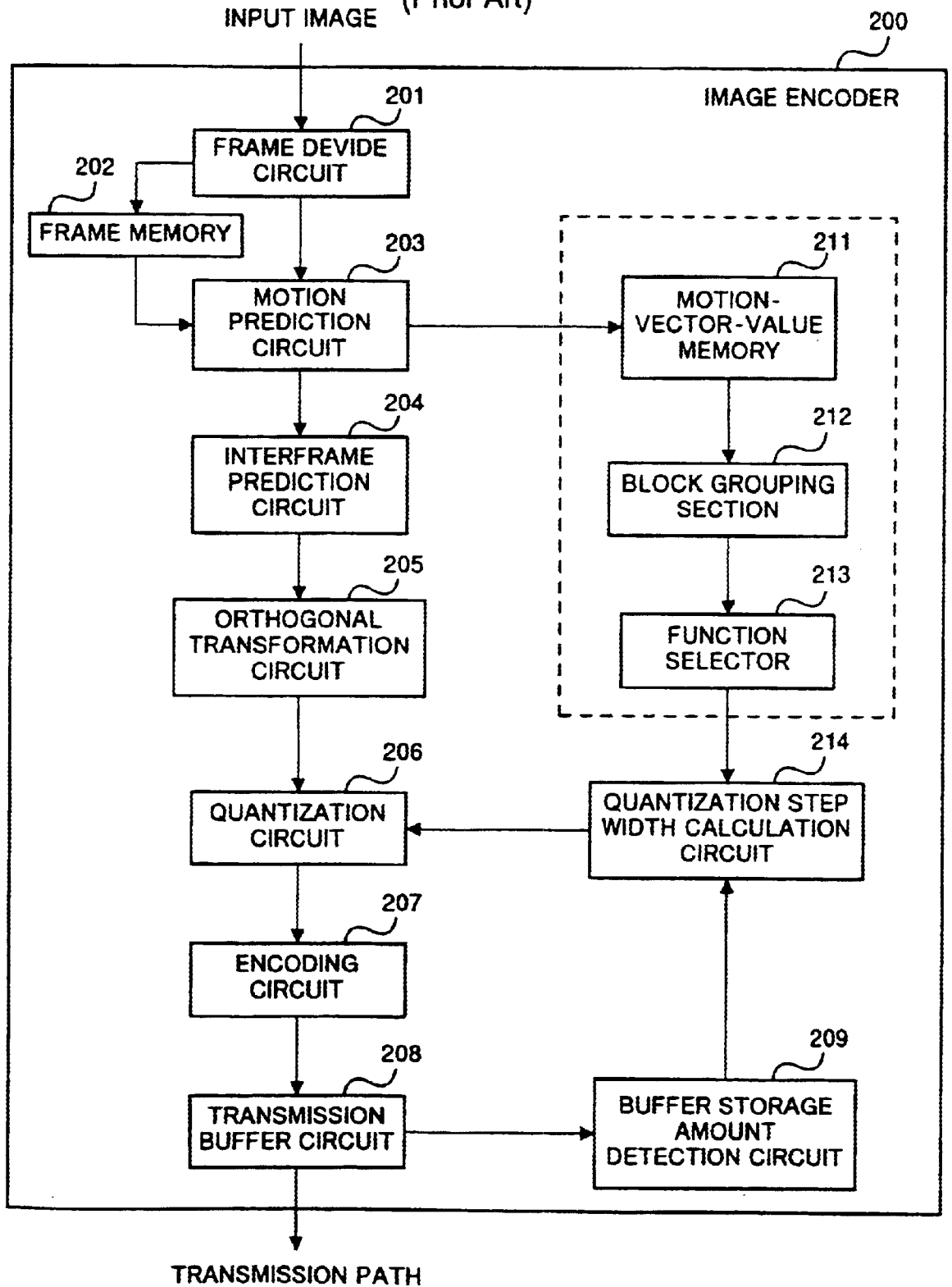
FIG. 8 is a diagram showing the structure of a circuit which employs another conventional image compression technique.
Figure 9:
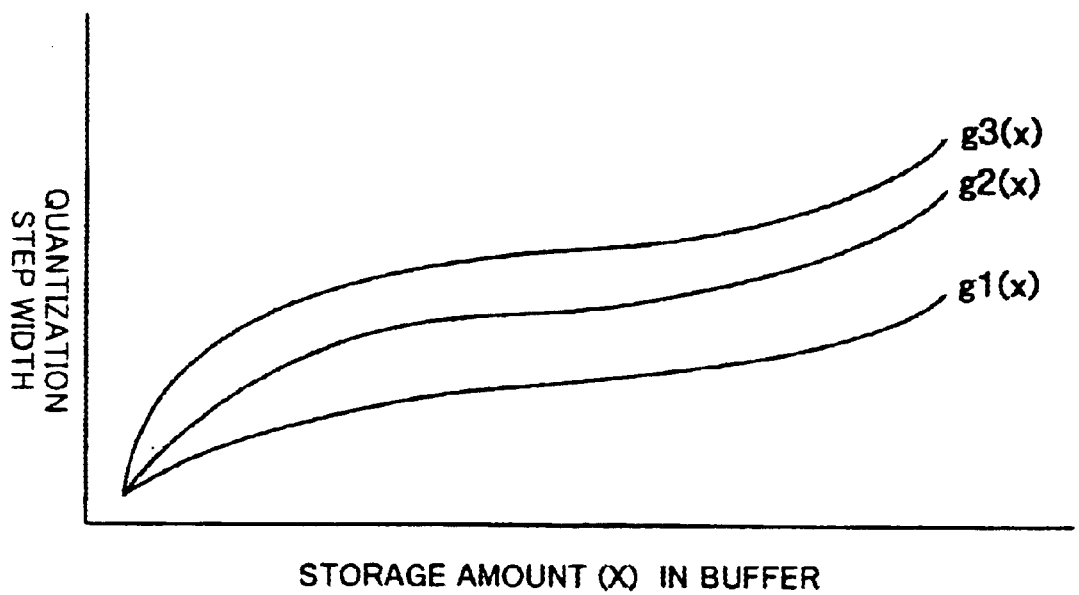
FIG. 9 is a diagram exemplarily showing examples of quantization step width functions which are set by a function selector included in the circuit of FIG. 8.

FIGS. 6A and 6B are diagrams each showing an example of an input image showing the situation wherein a man and a woman are in front of a camera of a TV conference system or TV telephone system. An input image 90a shown in FIG. 6A includes a woman's image 91a, a man's image 92a and a background image 93a of a direction pointer. Specifically, the image 90a shows the view wherein the woman speaks up in front of the camera and the man stays just beside her. An input image 90b shown in FIG. 6B includes a woman's image 91b, a man's image 92b and a background image 93b of a direction pointer. Specifically, the image 90b shows the view wherein the woman and man has moved to one side so that the man stays just in front of the camera, after the view of FIG. 6A is displayed for a predetermined period of time.

Of operations for receiving the input image 90a of FIG. 6A and the input image 90b of FIG. 6B, the operations carried out by each circuit or section, except the weighting section 20, inside the image encoder 10 are the same as those described above. Hence, the operations of the weighting section 20 will mainly be explained.

In the state where the view of FIG. 6A is continuously displayed for a predetermined period, if the image encoder 10 receives the input image 90a shown in FIG. 6A, the frame divide circuit 11 divides the input image 90a into an (N×M) number of blocks each having an (n×n) number of pixels, writes the (N×M) number of blocks into the frame memory 12, and inputs them to the motion prediction circuit 13. The motion prediction circuit 13 compares each block (target block) of the input image 90a input from the frame divide circuit 11 with a block of the previously-input frame input from the frame memory 12, which is in the same position as the position of the target block, and also with its neighboring blocks. The motion prediction circuit 13 finds out a block having the smallest difference from the target block. The motion prediction circuit 13 calculates a movement direction and mount of the found block with respect to the target block, sets the movement as a motion vector of the target block, and writes a value of the motion vector into the motion-vector-value memory 21. In this case, the view shown in FIG. 6A is continuously displayed for a predetermined period, the movement amount of each block included in the image is nearly zero. In addition, the value of each motion vector which the motion prediction circuit 13 writes into the motion-vector-value memory 21 is substantially zero.

The motion-vector-based block grouping section 22 can not arrange the blocks into groups based on motion vector, as a result that a process of grouping blocks included in the input image 90a is performed based on the value of each motion vector written into the motion-vector-value memory 21. Hence, the motion-vector-based block grouping section 22 supplies the weighting coefficient calculation circuit 27 with information representing that it cam not arrange the blocks into groups.

The interframe prediction circuit 14 detects the position of the found block in the previously-input frame with respect to each target block of the input image 90a, based on the motion vector, and calculates the differential data between the found block and the target block. The orthogonal transformation circuit 15 performs discrete cosine transformation so as to transform the differential data generated by the interframe prediction circuit 14 for each block included in the input image 90a, sends the transformed data to the quantization circuit 16, and writes DC of the brightness and color information of each block into the DC component memory 25.

The DC-component-based block grouping section 26 arranges the blocks of the input image frame into groups, so that blocks having the similar color and brightness belong to the same group, based on values of the DC components of the brightness and color information stored in the DC component memory 25. The DC-component-based block grouping section 26 then supplies the weighting coefficient calculation circuit 27 with the grouping information (by DC component) representing that the blocks of the image respectively belong to groups. In this case, for example, blocks corresponding to a portion of the face of the woman's image 91a constitute one group. Similarly, a portion of the hair of the woman's image 91a, a portion of the cloth thereof, a portion of the face of the man's image 92a, a portion of the hair of the man's image 92a and a portion of the hair thereof are each composed of a single group of blocks.

Since the grouping information (by motion vector) sent from the motion-vector-based block grouping section 22 represents that the grouping can not be achieved based on the motion vector, the weighting coefficient calculation circuit 27 calculates a weighting coefficient of each block included in the input image 90a, based on the grouping information (by DC component) sent from the DC-component-based block grouping section 26. That is, the weighting coefficient calculation circuit 27 calculates temporary weighting coefficients to the blocks within the same group in accordance with the graph of FIG. 3, for the groups of blocks respectively corresponding to the face portions, hair portions and cloth portions of the woman's and man's images 91a and 92a. Then, the weighting coefficient calculation circuit 27 obtains a mean value of the calculated temporary weighting coefficients of the blocks or the same group, and sets the obtained mean value as a weighting coefficient of the entire blocks of the same group. In this case, the weighting coefficient calculation circuit 27 assigns a larger weighting coefficient to each block corresponding to the face or hair portion of the woman's image 91a which is positioned in the center of the image, than the rest of the portions of the image. That is, those blocks corresponding to the man's image 92a or background image 93a are far from the center of the input image 90a, so that the weighting coefficient calculation circuit 27 assigns those blocks relatively small weighting coefficients.

The quantization step width calculation circuit 28 calculates the quantization step width in accordance wit the storage amount in the transmission buffer, using the functions f(s) shown in FIG. 4. After this, the quantization step width calculation circuit 28 divides this quantization step width for each block by a weighting coefficient of the block which is sent from the weighting coefficient calculation circuit 27, sets a resultant division as a quantization step width of the block, and sends the quantization step width to the quantization circuit 16.

The quantization circuit 16 quantizes to data sent from the orthogonal transformation circuit 15, by the quantization step width calculated by the quantization step width calculation circuit 28, and sends the quantized data to the encoding circuit 17. The encoding circuit 17 encodes the quantized data and data representing the motion vector into a variable-length code, and sends resultant data to the transmission buffer circuit 18. The transmission buffer circuit 18 stores the data sent from the encoding circuit 17, and sends the stored data to the transmission path at a constant rate in harmony with the transmission rate of the transmission path.

Accordingly, in the state where the view of FIG. 6A is continuously displayed, the image encoder 10 encodes the image data corresponding to the center portion, i.e. the face or hair portion of the woman's image 91*a*, of the image in a high degree of preciseness, and encodes the image data corresponding to the rest of portions of the input image 90*a* in a low degree of preciseness. After this, the image encoder 10 sends the encoded image to the transmission path.

Explanations will now be made to operations of the image encoder 10 in the case where the input image 90*a* of FIG. 6A shifts to the input image 90*b* of FIG. 6B.

In this case, the motion prediction circuit 13 detects the motion of each block corresponding to the woman's image and man's image, and writes the motion vector of each block into the motion vector value memory 21. The motion-vector-based block grouping section 22 arranges blocks of the input image into groups, based on each value of the motion vector written in the motion vector value memory 21. The motion-vector-based block grouping section 22 supplies the weighting coefficient calculation circuit 27 with grouping information (by motion vector) showing that the woman's image and man's image are each composed of a single group of blocks.

The weighting coefficient calculation circuit 27 calculates a weighting coefficient of each block of the input image in accordance with the graph of FIG. 2, based on the supplied grouping information. In the state where the input image 90*a* slightly shifts from its original position, a part of the man's image is not input to the camera. Thus, the number of blocks forming the woman's image is larger than the number of blocks forming the man's image. The weighting coefficient calculation circuit 27 assigns a large weighting coefficient to each block forming the woman's image, a relatively small weighting coefficient to each block forming the man's image and a very small weighting coefficient to each block forming the background image having no motion. If the entire man's image is input to the camera the number of blocks forming the woman's image is substantially the same as the number of blocks forming the man's image. The weighting coefficient calculation circuit 27 assigns substantially the same weighting coefficients to each block forming the woman's image and man's image. Further, as shown in FIG. 6B, if a portion of the woman's image is not input to the camera, the number of blocks forming the man's image becomes larger than the number of blocks forming the woman's image. Then, the weighting coefficient calculation circuit 27 assigns each block forming the man's image a larger weighting coefficient and each block forming the woman's image a smaller weighting coefficient.

The quantization step width calculation circuit 28 assigns a small quantization step width to each block forming the woman's image, a relatively large quantization step width to each block forming the man's image and a very large quantization step width to each block forming the background image, in the state where the input image 90*a* slightly shifts, based on the weighting coefficient assigned by the weighting coefficient calculation circuit 27. If the entire man's image is input to the camera, the quantization step width calculation circuit 28 assigns the quantization step width of substantially the same value to each block forming the woman's image and each block forming the man's image. If a portion of the woman's image is not input to the camera, as shown in FIG. 6B the quantization step width calculation circuit 28 assigns a small quantization step width to each block forming the man's image and a large quantization step width to each block forming the woman's image.

As a result of this, in the quantized image data encoded by the encoding circuit 17, each block forming the woman's image is encoded in a high degree of preciseness and each block forming the man's image is encoded in a relatively low degree of preciseness, in the state where the input image 90*a* slightly shifts away from its original position. Each block forming the man's image is encoded gradually in a higher degree of preciseness, and blocks forming the woman's image and man's image are encoded approximately in the same degree of preciseness. After this each block forming the woman's image is encoded gradually in a lower degree of preciseness, as the input image 90*a* shifts so as to reach the position of the image 90*b* shown in FIG. 6B.

Explanations will now be made to operations of the image encoder 10 in the case where the input image 90*b* of FIG. 6B is continuously displayed.

In this case, likewise the case where the input image 90*a* is continuously displayed, the motion-vector-based block grouping section 22 does not arrange the blocks into groups. Instead, the DC-component-based block grouping section 26 arranges the blocks of the input image 90*b* into groups, based on values of DV components of the brightness and color information stored in the DC component memory 25. The weighting coefficient calculation circuit 27, to which the DC-component-based block grouping section 26 sends the grouping information (by DC component), assigns a largest weighting coefficient to each block corresponding to the portions of the man's image 92*b* which is positioned in the center of the input image 90*b*. Because the rest of portions, such as those corresponding to the woman's image 91*b* or background image 93*b*, are positioned away from the center of the input image 90*b*, the weighting coefficient calculation circuit 27 assigns a relatively small weighting coefficient to those blocks corresponding to the rest of portions. The quantization-step-width calculation circuit 28 assigns a small quantization step width to each block forming the man's image 92*b* and a large quantization step width to each block forming the woman's image 91*b* or background image 93*b*, based on the assigned weighting coefficient.

As a result of this, in the state where the view shown in FIG. 6B is continuously displayed for a predetermined period, the image encoder 10 encodes the portion corresponding to the centered man's image 92*b* in a high degree of preciseness, and encodes the portions corresponding to the rest of portions of the input image 90*b* in a lower degree of preciseness, and sends the encoded image data to the transmission path.

As explained above, in the first embodiment of the present invention, the quantization step width is set small for a person's image which way possibly be important in the input image, and is set large for the rest of portions of the input image which are not so important. Having performed this, high quality image which is suitable for the TV conference system or TV telephone system can be transmitted. Further, even in the case where the input image has no motion, the display screen can be divide into several groups based on the color or brightness, and high quality image data showing the important image data of the main person can be transmitted.

In the first embodiment of the present invention, the weighting coefficient calculation circuit 27 uses the weighting coefficient assigned to each block according to the graphs of FIGS. 2 and 3. For example, in the case where the contents of the input image do not change suddenly, the weighting coefficient assigned to each block of the input image changes slightly on the average, so the amount and the preciseness of the input data to be transmitted change slightly. Therefore, in the case where the contents of the input data do not change suddenly, the above weighting coefficient is preferable. On the other hand, for example, in the case where the contents of the input image change suddenly, the weighting coefficients change greatly, so the amount and the preciseness of the image data to be transmitted change greatly. Therefore, in the case where the contents of the input image change greatly, the weighting coefficient calculation circuit 27 may use normalized weighting coefficient, and supply the quantization step width calculation circuit 28 with the normalized weighting coefficients. The normalized weighting coefficient is the adjusted weighting coefficient so that the sum of the entire weighting coefficients assigned to the entire blocks of the input image frame is within a predetermined range of values. The normalization of the weighting coefficients makes the amount and the preciseness of image data to be transmitted stable.

Furthermore, in the first embodiment, weighting coefficients for the quantization step width may be used instead of the weighting coefficients representing the importance of each portion or each block of the input image. In this case, the weighting coefficient calculation circuit 27 calculates the weighting coefficient of each block for the quantization step width according to a graph which shows the more the number of the blocks increases, the smaller the assigned coefficient becomes and a graph which shows the smaller weighting coefficient is given to the more centered positioned blocks, instead of the graphs shown in FIG. 2 and FIG. 3. Further, the quantization step width calculation circuit 28 calculates the quantization step width in accordance with the amount of data storage in the transmission buffer, using the functions f(x) shown in FIG. 4, calculates a product of the quantization step width and the weighting coefficient of the block for the quantization step width, and sends the calculated product as a quantization step width of the block to the quantization circuit 16.

Figure 5:
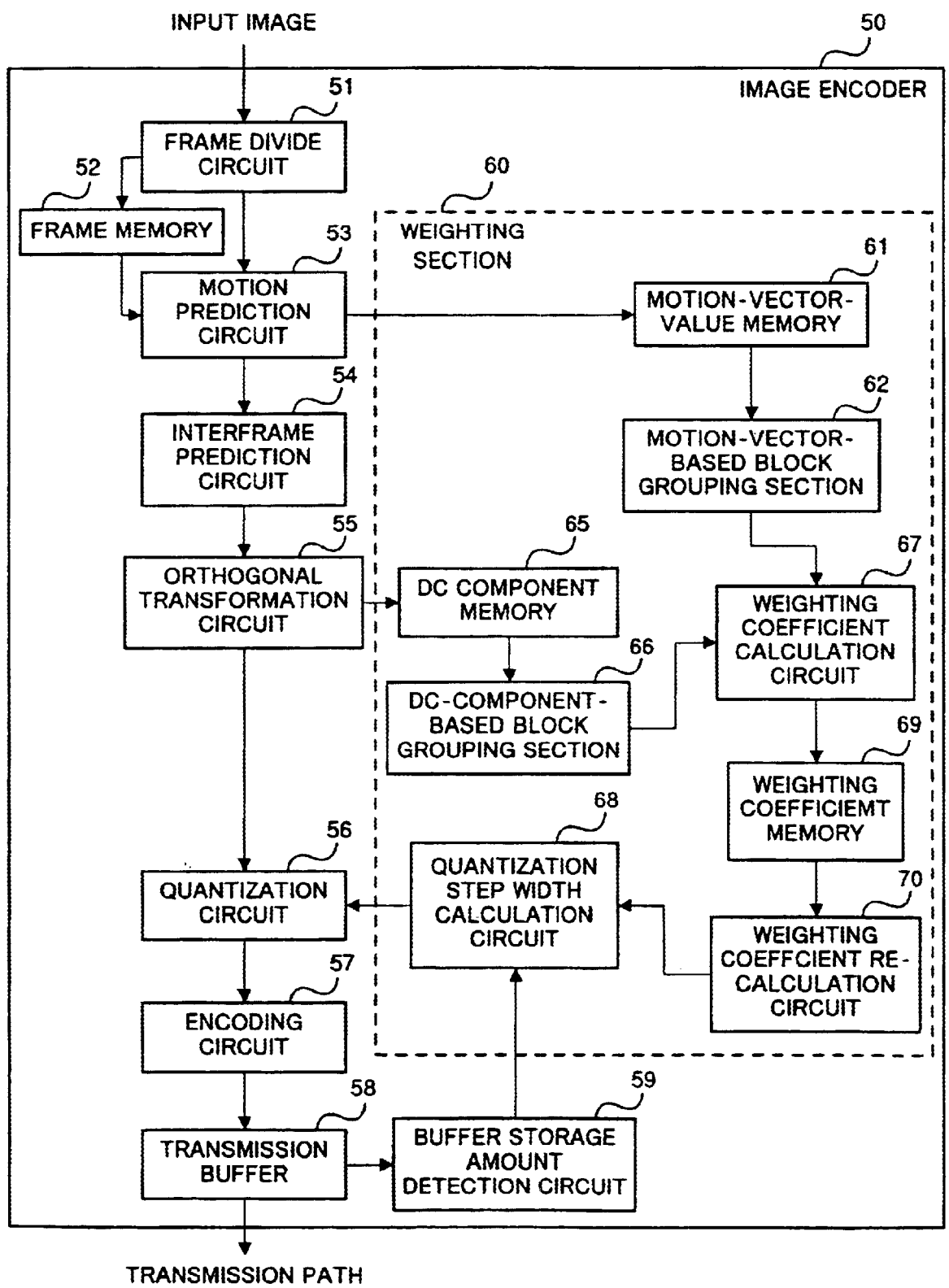
FIG. 5 is a block diagram showing the structure of an image encoder according to the second embodiment of the present invention.

FIG. 5 is a block diagram showing the structure of an image encoder according to the second embodiment of the present invention.

In the image encoder 50 according to the second embodiment, the same structural elements as those included in the image encoder 10 shown in FIG. 1 are identified in the same label in FIG. 5. As illustrated in FIG. 5, the image encoder 50 according to the second embodiment of the present invention further includes a weighting coefficient memory 69 and a weighting coefficient re-calculation circuit 70 in addition to the structure of the image encoder 10 shown in FIG. 1. In the structure of FIG. 1, the weighting coefficients calculated in the weighting coefficient calculation circuit 27 are sent to the quantization step width calculation circuit 28. In the structure of FIG. 5, weighting coefficients to be calculated in a weighting coefficient calculation circuit 67 are once stored in the weighting coefficient memory 69.

Stored in this weighting coefficient memory 69 are weighting coefficients calculated by the weighting coefficient calculation circuit 67 and assigned respectively to blocks of an K number of previous frames. The weighting coefficient re-calculation circuit 70 receives the weighting coefficients of the K number of previous frames from the weighting coefficient memory 69, calculates a new weighting coefficient based on Equation 1, as will be described below, and sends the calculated coefficient to the quantization step width calculation circuit 68.

$$v=0.5u(t)+0.25u(t-d)+0.15u(t-2d)+0.1u(t-3d) \qquad \text{Equation 1}$$

In the Equation 1, K=4, "v" represent a coefficient to be sent to the quantization step width calculation circuit, "u(t)" represents a coefficient of the time "t" calculated by the coefficient calculation circuit and "d" represents an interval of frames.

As explained above, in the second embodiment, the coefficient of the K number of previous frames is employed. Even in the case where the grouping can not desirably be achieved, the failure of the grouping has only a slight influence on the outcome image.

An image encoder according to the third embodiment of the present invention will now be described.

In the image encoder 10 according to the first embodiment of the present invocation, the weighting coefficient is calculated by the weighting coefficient calculation circuit based on a result of grouping done by the motion-vector-based block grouping section 22, if the motion vector is detected. On the contrary, the weighting coefficient is calculated by the weighting coefficient calculation circuit based on a result of grouping done by the DC-component-based block grouping section 26, if the motion vector is not detected.

In the image encoder according to the third embodiment of the present invention, the weighting coefficient calculation circuit 27 obtains a product of a weighting coefficient calculated based on a result of grouping done by the motion-vector-based block grouping section 22 and a weighting coefficient calculated based on a result of grouping done by the DC-component-based block grouping section 26. Then, the weighting coefficient calculation circuit 27 provides the quantization step width calculation circuit 28 with the obtained product.

The image encoder according to the third embodiment of the present invention can transmit the important portion of an input image in a high degree of preciseness, by extracting the important portion using DC components, even in the case where it is hard to extract the important portion only based on the motion vector, for example, in the case where there is motion only in a portion of the background image and no motion is found in the important portion of the input image.

Like the input image shown in FIGS. 6A and 6B, in the case where two persons' images have similar motion, the image encoder according to the third embodiment can transmit the image data, focusing on only one person staying right in front of the camera based on a result of grouping done based on DC components, during the movement of the two parsons.

In the case where the camera is moving around while the persons or background image do not have any motion, each portion of the input image has motion in a similar manner to other portions. Hence, the image encoder can not identify each portion of the input image only by grouping the blocks based on the motion vector. The image encoder groups the blocks of the input image, suitably based on the motion vector in combination with the DC components of the color information and brightness of each portion included in the input image. This enables to transmit the important portion of the input image in a high degree of preciseness.

Accordingly, the image encoder employing the structure or the present invention detects the motion vector of each of the plurality of blocks forming a single frame, arranges the blocks into groups based one the detected motion vector, and calculates a weighting coefficient for each group of blocks. In the case where the motion vector can not be detected, the image encodes of the present invention arranges the blocks into groups based on the DC components of the brightness and color information of each block, calculates a weighting coefficient for each group of blocks, and extracts the important portion of the input image. In such circumstances, the image encoder assigns a small quantization step to the important person's image in the input image and a large quantization step width to the background image, etc. which is not so important in the input image, and hence transmitting high quality image suitable for the TV conference system or TV telephone system. Even in the case where the input image does not have motion the input image is divided into portions based on the color information and brightness so that the high quality image of the important portion of the input image can be transmitted.

The motion vector of each target block is compared with a block included in a previously-input frame, thereby enabling to detect each motion vector with high accuracy.

The calculation of the weighting coefficient of each group is done based on the motion vector, in accordance with the number of blocks included in the group, so as to obtain the weighting coefficient with high accuracy.

The calculation of the weighting coefficient of each group is done based on the DC components, in accordance with the distance between the center of the block and the center of the frame, so as to obtain the weighting coefficient with high accuracy.

Further, the weighting coefficient is re-calculated using the plurality of previous weighing coefficients. Thus, even the grouping is not adequately performed, if the weighting coefficients of an K number of previous frames are employed, no serious problems should occur.

The image encoder of the present invention detects the motion vector of each of the plurality of blocks which constitute the input image frame, arranges the blocks into groups based on the detected motion vector and calculates a weighting coefficient of each group of blocks. Further, the image encoder arranges the blocks into groups based on the DC components of each block and calculates a weighting coefficient of each group. Subsequently, the image encoder calculates a product of the weighting coefficient of each group of blocks arranged based on the motion vector and the weighting coefficient of each group of blocks arranged based on the DC components, and extracts the important portion of the input image. Thus, even in the case where it is difficult to extract the important portion of the input image based only on the motion vector, for example in the case where there is motion only in one portion of the background image or the entire portions of the input image are similarly moving, the important portion of the input image is extracted using an extraction technique employing DC components so as to be transmitted in a high degree of preciseness.

The image encoder to the present invention may have the structure where each structural element is realized using a dedicated circuit. The image encoder of the present invention may comprise a general-purpose microprocessor and a memory unit, and a program for controlling the microprocessor to realize the functions of the structural elements may be executed. Otherwise, some of the entire structural elements may be realized using a dedicated circuit, while the rest of the structural elements are realized by the general-purpose microprocessor under the control of a program. In such a structure, a processor for certain purposes may be employed in place of the general-purpose processor, inside the image encoder of the present invention.

In the case where the image encoder of the present invention is incorporated into a computer, such as a personal computer, etc. A part of the entire structural elements of the image encoder may be realized using a program which is executing by a processor included in the computer.

In the case where the program for realizing the functions of the above-described structural elements is executed by a computer, such as the microprocessor, the processor for certain purposes, the personal computer or the like the program may be written in a ROM, or stored on a medium and installed into the computer. The above program may be posted on a BBS (Bulletin Board System) on a network or on a Web page, and distributed through a network. Data signals representing the program embedded in a carrier wave may be encoded, and the encoded signals in the carrier wave may be transmitted. Then, a device or system receiving this encoded signals may decode the received signals so as to restore the program.

Various embodiments and changes may be made thereonto without departing from the broad spirit and scope of the invention. The above-described embodiment are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-316229 filed on Oct. 17, 2000, and including specification, claims, drawings and summary. The disclosure of the above Japanese Patent Application is incorporated herein by reference in its entirety.

What is claimed is:

1. An image encoding method of compressing and encoding an input image frame, comprising:

dividing the input image frame into a plurality of blocks;

detecting a motion vector of each of the plurality of blocks;

classifying the plurality of blocks into one or more groups, according to one or two grouping method selected from motion vector based grouping based on the value of the detected motion vector and DC component based grouping based on DC components of brightness and color information of each block;

calculating a first weighting coefficient of the one or more groups in a case where the plurality of blocks are classified according to the motion vector based grouping, and calculating a second weighting coefficient of the one or more groups in a case where the plurality of blocks are classified according to the DC component based grouping; and quantizing each of the plurality of blocks by a quantization step width determined based on the first or second weighting coefficient.

2. The image encoding method according to claim 1, wherein
said detecting detects the motion vector by comparing each of the plurality of blocks with blocks included in a previously-input image frame.

3. The image encoding method according to claim 1, wherein:
in a case where the motion vector is detected, said classifying classifies the plurality of blocks according to the motion vector base grouping, and said quantizing quantizes each of the plurality of blocks by the quantization step width determined based on the first weighting coefficient;
in a case where the motion vector is not detected, said classifying classifies the plurality of blocks according to DC component based grouping, and said quantizing quantizes each of the plurality of blocks by the quantization step width determined based on the second weighting coefficient.

4. The image encoding method according to claim 1, wherein, in a case where the motion vector is detected:
said classifying classifies the plurality of block according to motion vector based grouping and the DC component based grouping; and
said quantizing quantizes each of the plurality of blocks by the quantization step width determined based on both the first and second weighting coefficients.

5. The image encoding method according to claim 1, wherein
said weighting coefficient calculating calculates the first weighting coefficient based on number of blocks included in each of the one or more groups classified according to motion vector based grouping.

6. The image encoding method according to claim 1, wherein
said weighting coefficient calculating calculates the second weighting coefficient based on a distance between center of each of the plurality of blocks, included in each group of the one or more groups classified according to DC component based grouping, and center of the input image frame.

7. The image encoding method according to claim 1, wherein
said classifying classifies the plurality of blocks into groups according to each or said motion vector based grouping and said DC component based grouping, in such a way that each of the groups forms a continuous portion of the input image frame.

8. The image encoding method according to claim 1, further comprising
re-calculating a weighting coefficient, using the first and second weighting coefficients calculated at said calculating and each of a plurality of previous weighting coefficients, and
wherein said quantizing quantizes each of the plurality of blocks based on the re-calculated weighting coefficient.

9. The image encoding method according to claim 1, further comprising:
encoding data of the motion vector detected at said detecting and data representing each of the plurality or blocks quantized at said quantizing into a variable-length code;
storing the data variable-length encoded at said encoding in a transmission buffer; and
checking an amount of data stored in the transmission buffer, and wherein said quantizing quantizes each of the plurality of blocks by a quantization step width determined, based on the data amount checked at said checking and the first or second weighting coefficient in accordance with the classification of the blocks.

10. A image encoder which compresses and encodes an input image frame, said image encoder comprising:
a frame divide circuit which divides the input image frame into a plurality of blocks;
a motion prediction circuit which detects a motion vector of each of the plurality of blocks;
an interframe prediction circuit which generates differential data in the plurality of blocks based on the motion vector detected by said motion prediction circuit;
an orthogonal transformation circuit which performs discrete cosine transformation for the differential data generated by said interframe prediction circuit, and calculates DC components of brightness and color information of each of the plurality of blocks;
a weighting section which calculates a quantization step width for use in quantizing resultant data of the discrete cosine transformation performed by said orthogonal transformation circuit, based on the motion vector detected by said motion prediction circuit and the DC components calculated by said orthogonal transformation circuit; and
a quantization circuit which quantizes the resultant data of the discrete cosine transformation performed by said orthogonal transformation circuit, by the quantization step width calculated by said weighting section.

11. The image encoder according to claim 10, wherein:
said weighting section includes
a motion vector based grouping section which classifies the plurality of blocks into one or more groups, based on a value of the motion vector detected by said interframe prediction circuit;
a DC component based grouping section which classifies the plurality of blocks into one or more groups, based on the DC components of each of the plurality of blocks which are calculated by said orthogonal transformation circuit;
a weighting coefficient calculation circuit which calculates a weighting coefficient for determining the quantization step width for each of the plurality of blocks; and
a quantization step width calculation circuit which calculates the quantization step width based on the weighting coefficient calculated by said weighting coefficient calculation circuit, and
wherein said weighting coefficient calculation circuit calculates a first weighting coefficient for the one or more groups classified by said motion vector based grouping section, calculates a second weighting coefficient for the one or more groups classified by said DC component based grouping section, and calculates a weighting coefficient for determining the quantization step width based on one or two weighting coefficients selected from the first and second weighting coefficients, using motion vector detected by said motion prediction circuit.

12. The image encoder according to claim 11, further comprising
a frame memory which stores the input image frame which has been divided into the plurality of blocks by said frame divide circuit, and
wherein said motion prediction circuit compares each of the plurality of blocks with blocks included in a previously-input image frame stored in said frame memory so as to detect the motion vector.

13. The image encoder according to claim 11, wherein said weighting coefficient calculation circuit:
   sets the first weighting coefficient as a weighting coefficient for determining the quantization step width, in a case where the motion vector is detected by said motion prediction circuit; and
   sets the second weighting coefficient as a weighting coefficient for determining the quantization step width, in a case where the motion vector is not detected by said motion prediction circuit.

14. The image encoder according to claim 11, wherein said weighting coefficient calculation circuit sets a product of the first and second weighting coefficients as a weighting coefficient for determining the quantization step width, in a case where the motion vector is detected by said motion prediction circuit.

15. The image encoder according to claim 11, wherein said weight coefficient calculation circuit calculates the first weighting coefficient, based on number of blocks included in the one or more groups classified by said first grouping section.

16. The image encoder according to claim 11, wherein said weighting coefficient calculation circuit calculates the second weighting coefficient based on a distance between center of each block, included in each group of the one or more groups classified by said second grouping section, and center of the input image frame.

17. The image encoder according to claim 11, wherein:
   said motion vector based grouping section classifies the plurality of blocks into groups, in such a way that each of the groups forms a continuous portion of the input image frame; and
   said DC component based grouping section classifies the plurality of blocks into groups, in such a way that each of the groups forms a continuous portion of the input image frame.

18. The image encoder according to claim 11, wherein:
   said weighting section includes a weighting coefficient re-calculation circuit which re-calculates a weighting coefficient using the first and second weighting coefficients calculated by said weighting coefficient calculation circuit and each of a plurality of previous weighting coefficients, and
   said quantization step width calculation circuit determines the quantization step width based on the re-calculated weighting coefficient.

19. The image encoder according to claim 11, further comprising:
   an encoding circuit which encodes the data quantized by said quantization circuit and data representing the motion vector detected by said motion prediction circuit into a variable-length code;
   a transmission buffer which stores the data which is encoded into the variable-length code by said encoding circuit; and
   a buffer storage amount checking circuit which checks an amount of data stored in said transmission buffer, and
   wherein said quantization step width calculation circuit calculates the quantization step width based on the data amount checked by said buffer storage amount checking circuit and the weighting coefficient for determining the quantization step width.

20. A computer readable recording medium which records a program for controlling a computer to execute:
   dividing an input image frame into a plurality of blocks;
   detecting a motion vector of each of the plurality of blocks;
   classifying the plurality of blocks into one or more groups, according to one or two grouping method selected from motion vector based grouping based on the value of the detected motion vector and DC component based grouping based on DC components of brightness and color information of each block;
   calculating a first weighting coefficient of the one or more groups in a case where the plurality of blocks are classified according to the motion vector based grouping, and calculating a second weighting coefficient of the one or more groups in a case where the plurality or blocks are classified according to the DC component based grouping; and
   quantizing each of the plurality of blocks by a quantization step width determined based on the first or second weighting coefficient.

* * * * *